US007712296B2

(12) United States Patent
Costa et al.

(10) Patent No.: US 7,712,296 B2
(45) Date of Patent: May 11, 2010

(54) SYSTEMS AND METHODS FOR HARVESTING AND PROCESSING LEAFY VEGETABLES

(76) Inventors: Mike Costa, 26136 Legends Ct., Salinas, CA (US) 93923; Peter DeGroot, 24933 Outlook Dr., Carmel, CA (US) 93923

( * ) Notice: Subject to any disclaimer, the term of this patent is extended or adjusted under 35 U.S.C. 154(b) by 1090 days.

(21) Appl. No.: 11/195,401

(22) Filed: Aug. 1, 2005

(65) Prior Publication Data
US 2006/0021317 A1    Feb. 2, 2006

Related U.S. Application Data

(60) Provisional application No. 60/598,199, filed on Jul. 30, 2004, provisional application No. 60/645,993, filed on Jan. 21, 2005.

(51) Int. Cl.
*A01D 45/00*    (2006.01)

(52) U.S. Cl. .................................... 56/327.1

(58) Field of Classification Search ............. 56/327.1, 56/14.5; 99/643, 546, 636; 171/61, 38, 17; 198/626.1
See application file for complete search history.

(56) References Cited

U.S. PATENT DOCUMENTS

| 3,503,196 A | * | 3/1970 | Jarrett | 56/327.1 |
| 3,821,987 A | * | 7/1974 | Shepardson et al. | 171/61 |
| 3,827,503 A | * | 8/1974 | Hansen | 171/38 |
| 3,921,723 A | * | 11/1975 | Seem | 171/14 |
| 4,094,238 A | * | 6/1978 | Striplin | 99/643 |
| 4,519,191 A | * | 5/1985 | Ledebuhr et al. | 56/331 |
| 4,967,545 A | * | 11/1990 | Fischer et al. | 56/12.9 |
| 5,107,664 A | * | 4/1992 | Ross et al. | 56/121.4 |
| 5,363,634 A | * | 11/1994 | Saito | 56/121.42 |
| 5,560,190 A | * | 10/1996 | Ottaway | 56/327.1 |
| RE35,917 E | * | 10/1998 | Fischer et al. | 56/12.9 |
| 5,964,081 A | * | 10/1999 | Ingram | 56/14.5 |
| 6,173,559 B1 | * | 1/2001 | Nevarez, Sr. | 56/16.5 |
| 6,230,477 B1 | * | 5/2001 | Caillouet | 56/14.5 |
| 6,378,281 B1 | * | 4/2002 | Ottaway | 56/327.1 |
| 6,484,810 B1 | * | 11/2002 | Bendix et al. | 171/31 |
| 6,622,467 B1 | * | 9/2003 | Ottaway | 56/327.1 |
| 6,996,964 B2 | * | 2/2006 | Maconachy et al. | 56/327.1 |
| 7,062,899 B2 | * | 6/2006 | Maconachy et al. | 56/327.1 |
| 2004/0149545 A1 | * | 8/2004 | Tarantino et al. | 198/690.2 |

* cited by examiner

*Primary Examiner*—Árpád Fábián-Kovács
(74) *Attorney, Agent, or Firm*—Townsend and Townsend and Crew LLP

(57) ABSTRACT

An apparatus that moves through fields of leafy vegetables and trims harvested heads of leafy vegetables. The apparatus includes a body and a plurality of supports coupled to the body for movement relative thereto. The supports are configured for supporting pieces of leafy vegetables. The apparatus further includes a plurality of cutters coupled to the body that are arranged serially and a transport system for moving the supports past the cutters. A collector is included for collecting leaves cut from the vegetables.

31 Claims, 7 Drawing Sheets

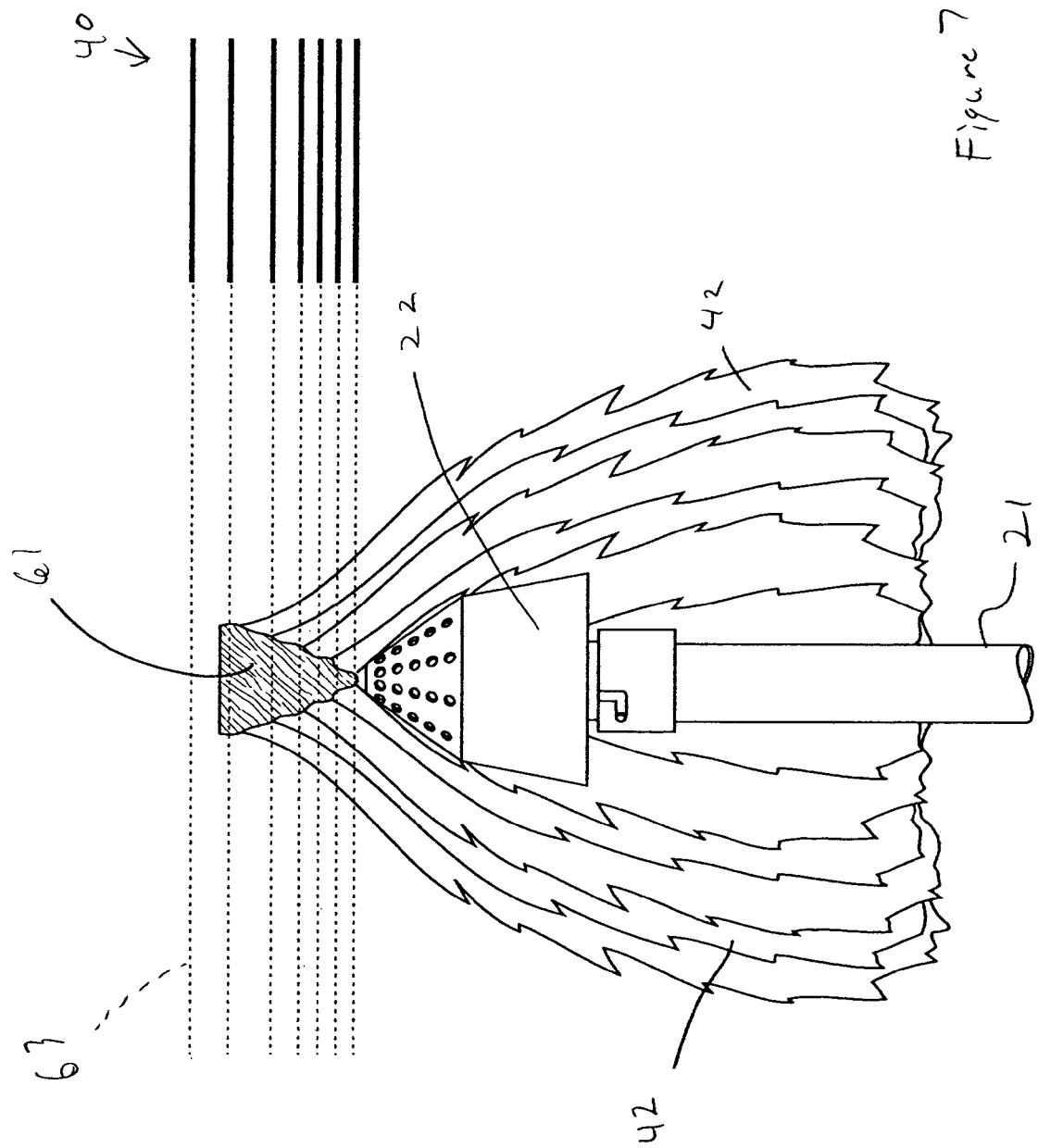

SYSTEMS AND METHODS FOR HARVESTING AND PROCESSING LEAFY VEGETABLES

CROSS-REFERENCES TO RELATED APPLICATIONS

This application is a non-provisional application and claims the benefit of Application No. 60/598,199, filed Jul. 30, 2004, entitled "Systems and Methods for Harvesting Leafy Vegetables" and Application No. 60/645,993, filed Jan. 21, 2005, entitled "Systems and Methods for Harvesting Leafy Vegetables Using Atmospheric Clamps", the disclosures of which are incorporated herein by reference for all purposes.

BACKGROUND OF THE INVENTION

1. Field of the Invention

The present invention relates to systems and methods for harvesting and processing leafy vegetables, and more particularly, to systems and methods for harvesting and processing leafy vegetables wherein the leaves are fairly loose, such as, for example, red leaf lettuce, green leaf lettuce, romaine lettuce, iceberg lettuce, frizee, oriental kale, etc.

2. Description of the Prior Art

The demand for leafy vegetables has greatly increased over the years. Salads are now often in high demand for meals, whether as an entree, a side dish or an appetizer. Thus, leafy vegetables are generally grown and harvested year-round in various parts of the United States.

There are numerous ways for harvesting and processing various types of leafy vegetables such as lettuce. Often, the methods include manually cutting heads of lettuce from the ground and then manually trimming the leaves from the core. This is time consuming and can lead to a fair amount of waste. Additionally, it is desirable to avoid damage to the ribs and leaves of the lettuce, which can happen during harvesting.

Furthermore, while the harvesting takes place in the fields, the processing usually takes place away from the fields, generally in large buildings or warehouses. This means that the vegetables must be harvested, temporarily packaged, unpackaged, transported, unpackaged, processed and then repackaged. The processing generally involves cutting and coring the leafy vegetables, usually manually, then washing and substantially drying the leaves and placing them in appropriate packaging.

BRIEF SUMMARY OF THE INVENTION

The present invention provides an apparatus for harvesting and processing leafy vegetables wherein the apparatus includes a body and a plurality of supports coupled to the body for movement relative thereto. The supports are configured for supporting pieces of leafy vegetables. The apparatus further includes a plurality of cutters coupled to the body that are arranged serially and a transport system for moving the supports past the cutters. A collector is included for collecting leaves cut from the vegetables.

In accordance with one aspect of the present invention, the supports are coupled to a vacuum source. Each support includes a vacuum head for supporting the pieces of leafy vegetables.

In accordance with another aspect of the present invention, the apparatus further includes blowers adjacent each cutter.

In accordance with a further aspect of the present invention, the collector is a conveyor belt that moves relative to the body.

In accordance with another aspect of the present invention, the apparatus is a self-propelled vehicle that may be operated in the field where the leafy vegetables are harvested.

In accordance with a further aspect of the present invention, the apparatus is a trailer that may be operated in the field where the leafy vegetables are harvested.

In accordance with a further aspect of the present invention, the cutters are staggered vertically with respect to one another.

In accordance with yet another aspect of the present invention, the cutters are staggered in a descending manner such that a first cutter at a first end of the apparatus is at a first height and a last cutter at a second end of the apparatus is at a second height, the second height being lower than the first height, with cutters in-between the first and last cutters being at a lower height than an adjacent cutter relative to the first end.

In accordance with yet another aspect of the present invention, adjacent cutters are staggered vertically in a range of one-quarter inch to one and three quarter inches.

In accordance with yet another aspect of the present invention, adjacent cutters are staggered vertically one quarter inch.

In accordance with a further aspect of the present invention, the cutters comprise rotary blades.

In accordance with another aspect of the present invention, the cutters comprise water jets.

In accordance with a further aspect of the present invention, the cutters comprise straight blades.

In accordance with another aspect of the present invention, the leafy vegetables are one of a group comprising red leaf lettuce, green leaf lettuce, romaine lettuce, iceberg lettuce, frieze and oriental kale.

The present invention also provides a method of harvesting leafy vegetables with a harvesting apparatus where the method comprises providing pieces of leafy vegetables and supporting the pieces of leafy vegetables on supports. The method also includes moving the supports past a series of cutters and cutting the pieces of leafy vegetables with the cutters to thereby remove leaves from the pieces of leafy vegetables. The leaves are collected with a collector.

Other features and advantages of the present invention will be apparent in view of the following detailed description of preferred exemplary embodiments.

BRIEF DESCRIPTION OF THE DRAWINGS

FIG. 7 is a schematic view illustrating processing of a head of leafy vegetable with a harvester and processor in accordance with the present invention.

DETAILED DESCRIPTION OF THE INVENTION

Figure 1:
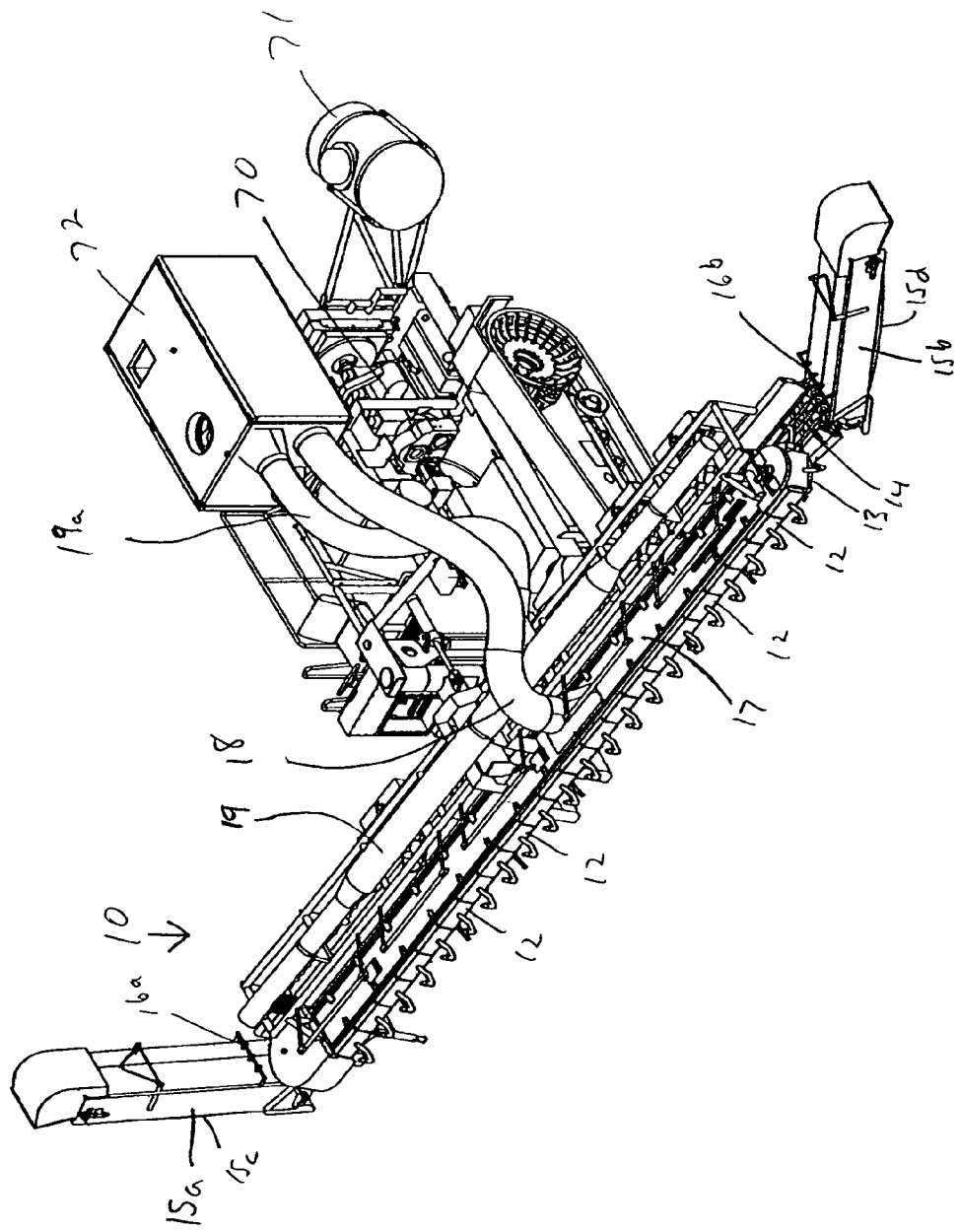
FIG. 1 is a perspective view of a self-propelled leafy vegetables harvester and processor in accordance with the present invention.
Figure 3:
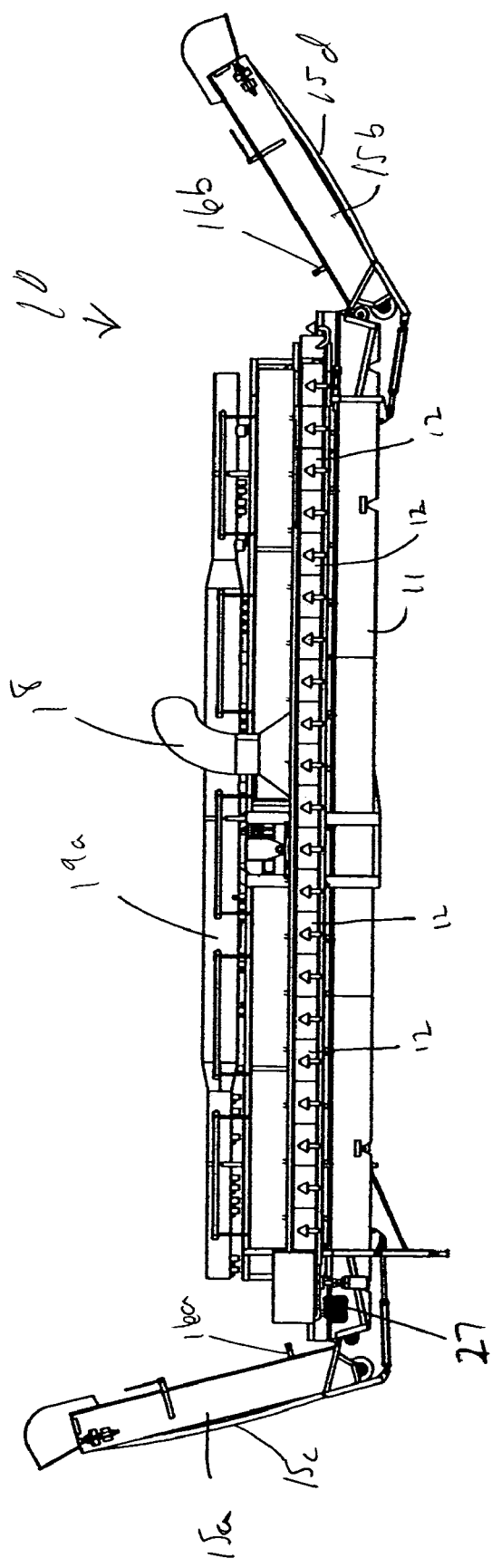
FIG. 3 is a front elevational view of a leafy vegetables harvester and processor in accordance with the present invention.
Figure 4:
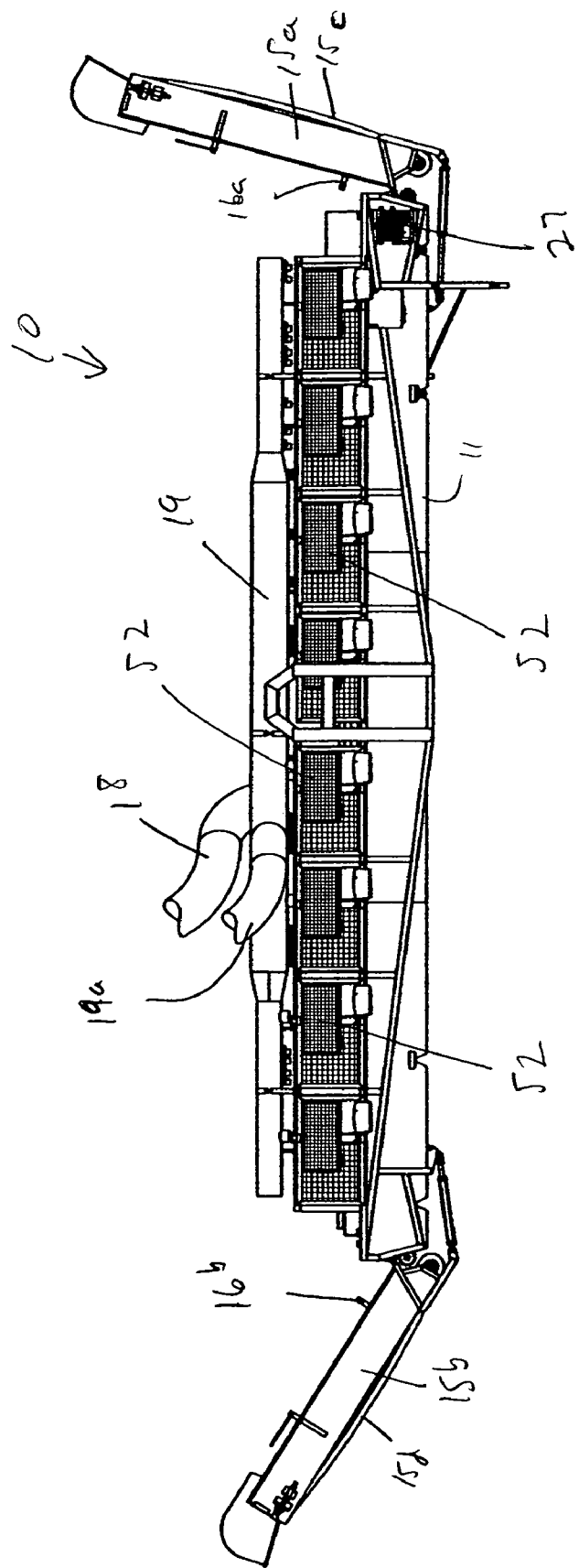
FIG. 4 is a back elevational view of a leafy vegetables harvester and processor in accordance with the present invention.

FIGS. 1 and 3-4 illustrate an apparatus 10 for harvesting and processing leafy vegetables such as, for example, red leaf lettuce, green leaf lettuce, romaine lettuce, iceberg lettuce, frizee, oriental kale, etc. As may be seen in FIGS. 3-4, the apparatus includes a body 11 that has a plurality of support arrangements 12 coupled thereto. The support arrangements are coupled to the apparatus preferably via a belt or chain-type drive 13 in such a way that they may be moved through the apparatus. A collector 14, preferably in the form of a conveyor belt, is also provided. Collection conveyors 15a, b is preferably provided at both ends of the apparatus and include conveyor belts 15c, 15d. A set of rinse nozzles 16a, b is preferably also provided. A vacuum chamber 17 is provided that is coupled to a vacuum source (not shown) via conduit 18. A blower chamber 19 is preferably provided that is coupled to a blower source (not shown) via conduit 19a.

Figure 2:
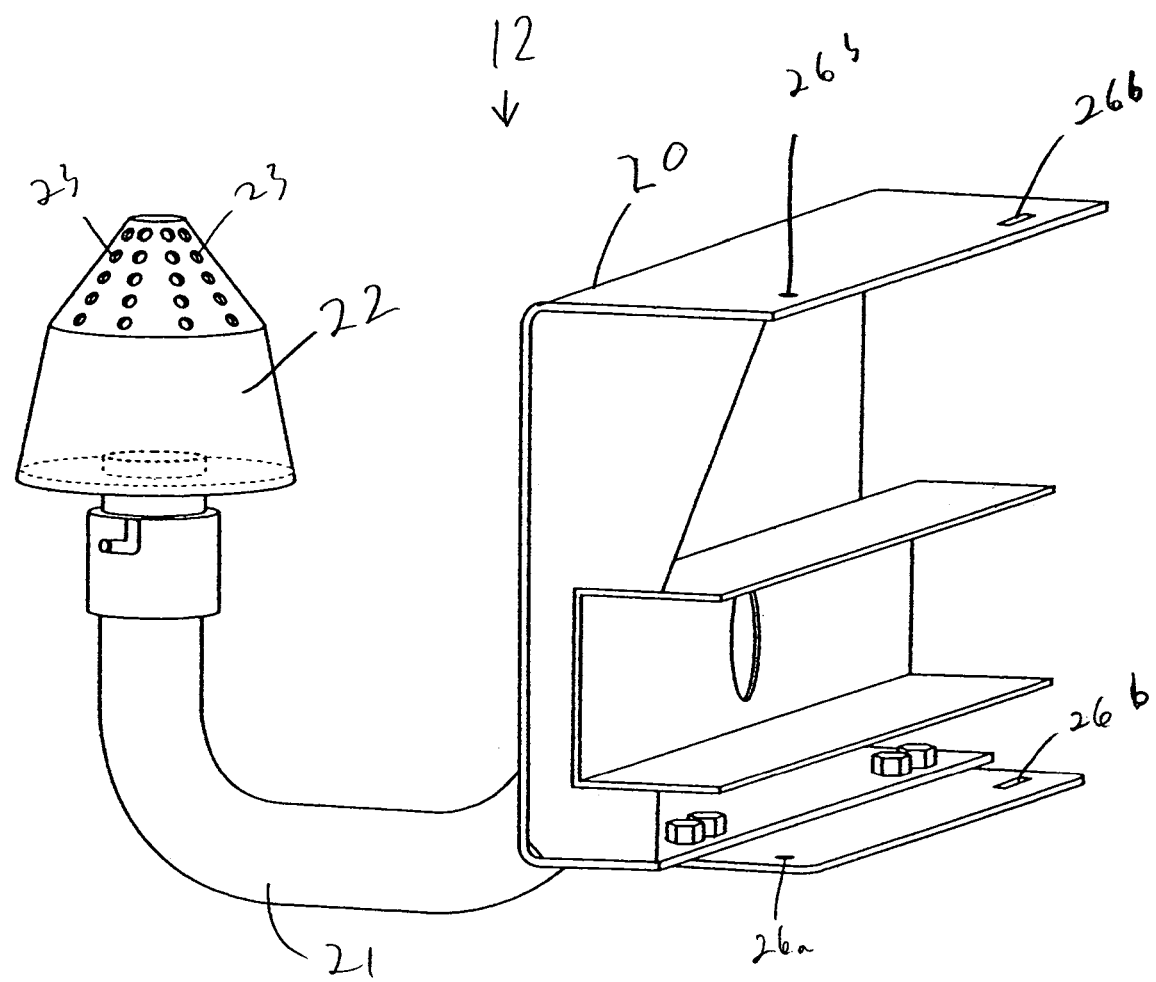
FIG. 2 is a perspective view of a type of support for use with the leafy vegetables harvester illustrated in FIG. 1.
Figure 6:
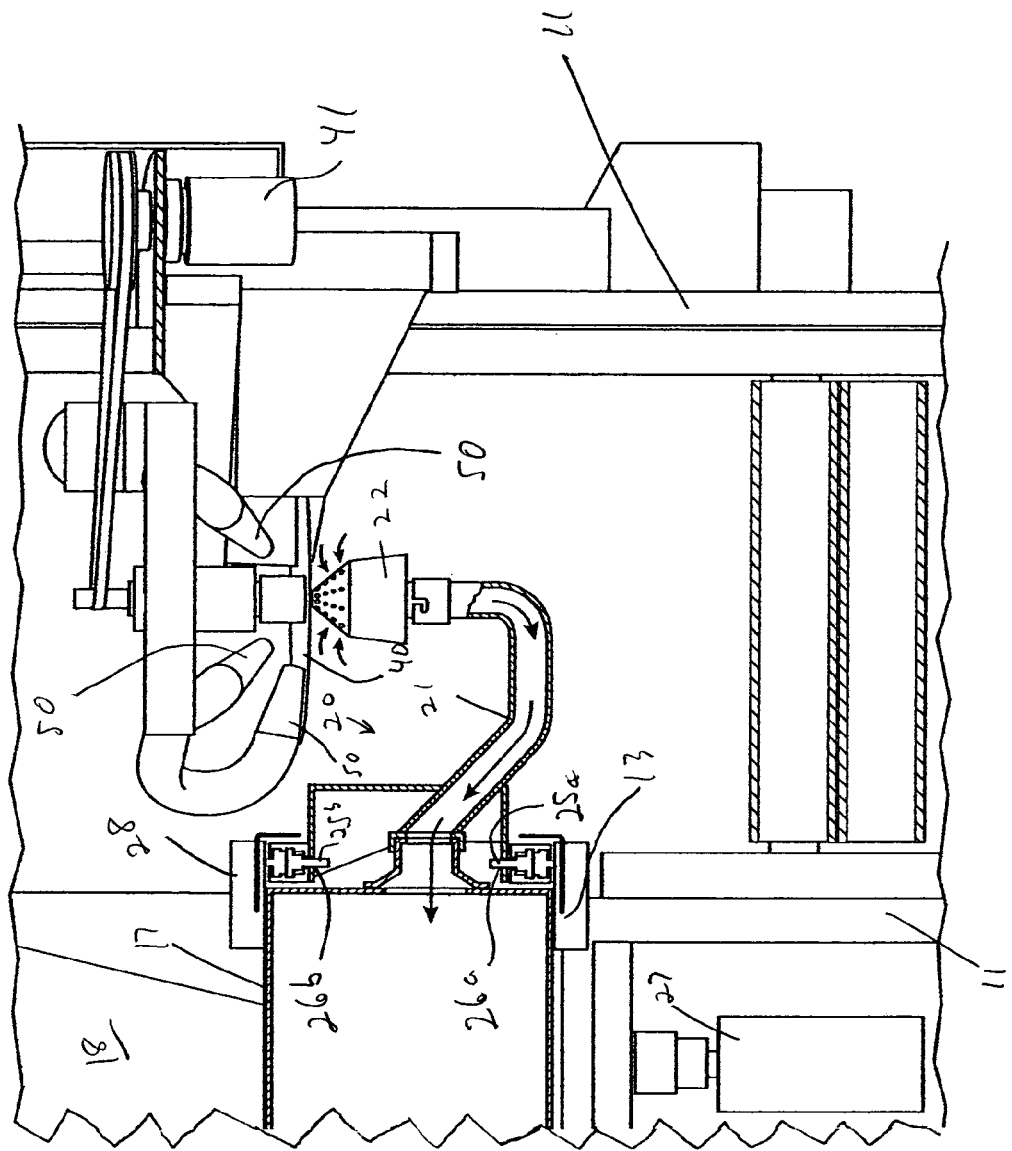
FIG. 6 is a sectional view of the leafy vegetables harvester and processor in accordance with the present invention.

With regard to FIGS. 2 and 6, it may be seen that the support arrangements preferably include a body 20, a support 21 and a vacuum head 22 that includes a plurality of holes 23. Preferably, each support is hollow and each body engages the vacuum chamber to provide a vacuum at the plurality of holes to hold harvested pieces or heads of leafy vegetables thereon. Thus, the supports and vacuum heads serve as atmospheric clamps. As may be seen in FIG. 6, vacuum chamber 17 provides a vacuum through support 21 and vacuum head 22 thereby creating suction at holes 23. The bodies are preferably coupled to conveyor 13 with pins 25a through openings 26a. Motor 27 is provided to move conveyor 13. The bodies are coupled to a guide 28 with pins 25b through openings 26b.

Figure 5:
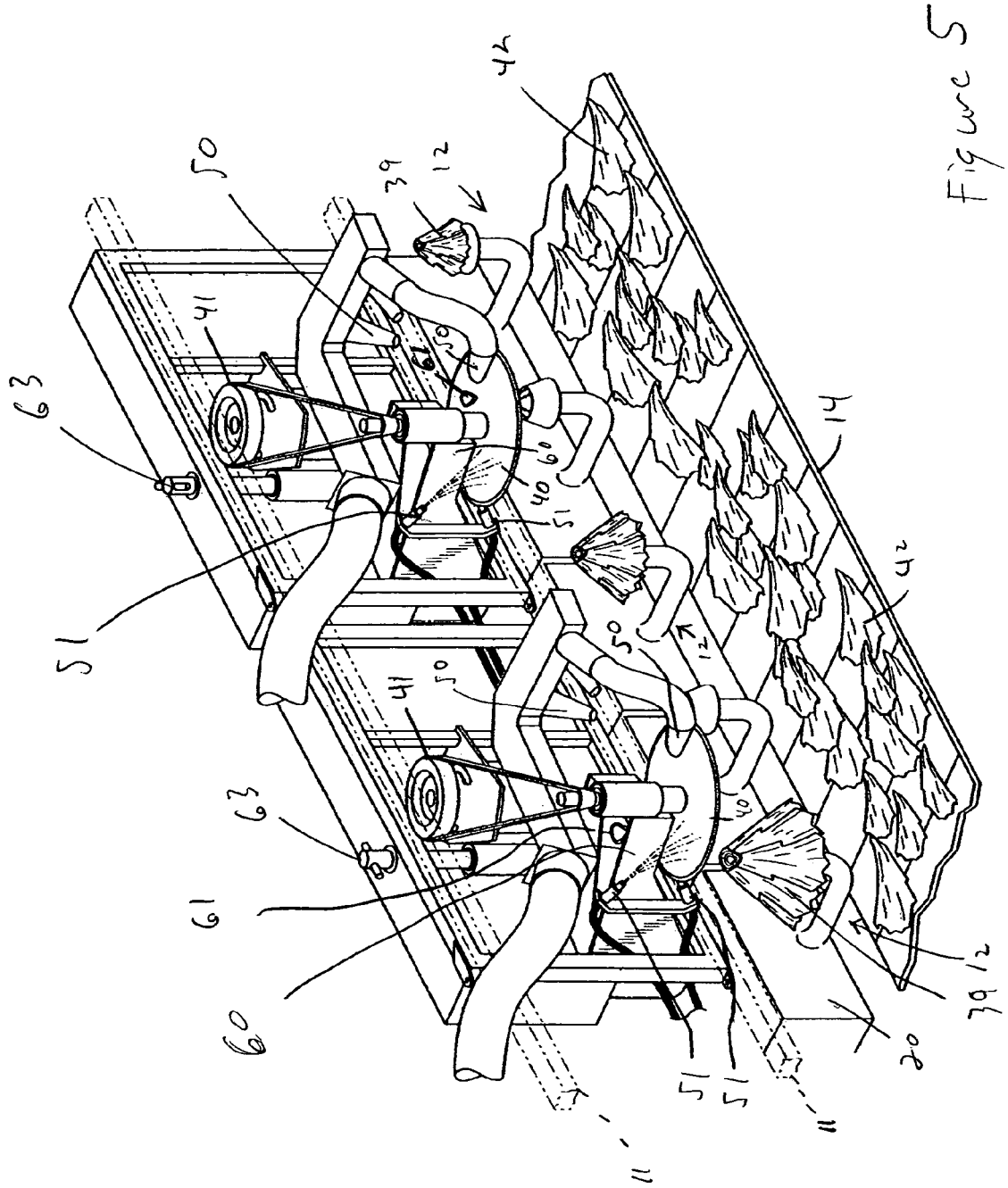
FIG. 5 is a perspective view a portion of the leafy vegetables harvester and processor in accordance with the present invention in operation.

As may be seen in FIG. 5, support arrangements 12 are moved through apparatus 10 in order to move the heads of leafy vegetables 39 past a plurality of cutters 40 that are arranged serially and are driven by motors 41. As heads of leafy vegetables move past a cutter, leaves 42 are cut from the head. These leaves fall to conveyor 14 below, which moves the cut leaves to the end of the apparatus where they are gathered and packed. Blower nozzles 50, coupled to blower chamber 19, are preferably provided adjacent to the cutters to help blow cut leaves onto the conveyor. Additionally, nozzles 51 are preferably provided to spray a liquid such as water onto the blades to help keep them clean. The nozzles also help keep the heads and cut leaves wet.

Each of the cutters is preferably offset a certain height with respect to the other cutters since as the leaves are cut, the blade needs to be at a different height and position in order to cut through the shortened heads of leafy vegetables. The other cutters may be adjusted height-wise depending upon the size of the heads of leafy vegetables. The size and tightness of the heads of vegetables generally vary over the course of a season. Preferably, approximately a quarter inch offset is provided between each cutter. In one example of the present invention, eight cutters are provided, although the number of cutters may range from one to twelve as desired. Examples of variances in the cutter height are in a range of ¼ inch to 3 inches. Additionally, cutters may be removed or positioned so as not to be in use if desired.

In a preferred embodiment, cutters 40 are rotary blades. Alternatively, water cutters or straight blades may be used if desired. Those skilled in the art will understand that even other types of cutters may be employed as desired.

Preferably a guide or "lead" 60 is provided adjacent each rotary blade. Pieces of cut core 61 from the heads of leafy vegetables fall onto the blade and are then spun against the guide and move, preferably through a shoot-type guide 62, out to a basket-like screen or container (not shown), or simply fall to the ground. This helps prevent the pieces of core from ending up on the conveyor with the desired cut leaves. Additionally, nozzles 51 are preferably provided to help keep the cutters clean and the heads and cut leaves wet.

Preferably, the cutters, motors and guides may pivot about arm 63 with protective screens 52 for servicing or other maintenance functions.

Accordingly, as may be seen in FIG. 5, in operation, a piece of leafy vegetable 39 in the form of a head is harvested from the ground. The harvested head is placed in an inverted position on a support arrangement 12 with the leaves spread open so that the vacuum head goes centrally up inside of the harvested head and the core is supported by vacuum head. The support arrangement then moves through the apparatus by chain or conveyor-type drive 13. As the support arrangement moves through the apparatus, the vacuum head hold the harvested head in place. The support arrangement moves past the series of cutters 40 and leaves 42 are cut from the harvested head by the various cutters.

More particularly, FIG. 7 schematically illustrates a head of leafy vegetable 39 supported on vacuum head 22 and support 21 being processed by series of cutters 40. Dashed lines 63 illustrate how the head of leafy vegetables are successively cut by the series of cutters 40. Each cutter 40 cuts through core 61 and leaves 42 as the head moves past the cutter to thereby cut the leaves from the head of leafy vegetable.

Apparatus 10 is preferably configured to move through fields of leafy vegetables as a self-propelled motor vehicle with its own motor and controls. An example is illustrated in FIG. 1. The motor vehicle preferably includes a motor 70 and a liquid supply 71 for supplying nozzles 16a,b and 51 with a liquid, preferably water. Housing 72 is preferably provided for housing a vacuum source (not shown) and a blower source (not shown). Alternatively, apparatus 10 may be configured as a trailer to be moved by a tractor or other type of motor vehicle (not shown). Additionally, those skilled in the art will realize that apparatus 10 may also be set-up as a stationary unit in a field or other location.

As may be seen in FIGS. 1, 3 and 4, apparatus 10 preferably includes two collection conveyors 15a, b. This allows for apparatus 10 to be moved back and forth within a field without the need to reverse the positioning of a separate vehicle (not shown) that is receiving cut leaves from the collection conveyors. Thus, this separate vehicle may move and remain within the portion of the field that has already been harvested. Thus, conveyor 13 is also reversible to allow for the reversal of the movement of support arrangements 12. Likewise, collector 14 is also reversible. Since cutters 40 are adjustable height-wise, this also allows for reversibility of apparatus 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus for harvesting and processing leafy vegetables, the apparatus comprising:
   a body;
   a plurality of supports coupled to the body for movement relative thereto and configured for supporting heads of leafy vegetables, wherein each support is configured to fit inside a leafy vegetable head and hold the head thereon;
   plurality of cutters coupled to the body and arranged serially; and
   a transport system for moving the supports past the cutters; and
   a collector for collecting leaves cut from the vegetable heads.

2. An apparatus in accordance with claim 1 wherein the supports are coupled to a vacuum source and each support includes a vacuum head that creates a differential pressure for holding the heads of leafy vegetables thereon.

3. An apparatus in accordance with claim 2 further comprising blowers adjacent each cutter.

4. An apparatus in accordance with claim 1 wherein the collector is a conveyor belt that moves relative to the body.

5. An apparatus in accordance with claim 1 wherein the apparatus is a self-propelled vehicle that may be operated in the field where the leafy vegetables are harvested.

6. An apparatus in accordance with claim 1 wherein the apparatus is a trailer that may be operated in the field where the leafy vegetables are harvested.

7. An apparatus in accordance with claim 1 wherein the cutters are staggered vertically with respect to one another.

8. An apparatus in accordance with claim 7 wherein the cutters are staggered in a descending manner such that a first cutter at a first end of the apparatus is at a first height and a last cutter at a second end of the apparatus is at a second height, the second height being lower than the first height and cutters in between the first and last cutters being at a lower height than an adjacent cutter relative to the first end.

9. An apparatus in accordance with claim 8 wherein adjacent cutters are staggered vertically in a range of ¼ inch to 1¾ inches.

10. An apparatus in accordance with claim 9 wherein adjacent cutters are staggered vertically ¼ inch.

11. An apparatus in accordance with claim 1 wherein the cutters comprise rotary blades.

12. An apparatus in accordance with claim 1 wherein the cutters comprise water jets.

13. An apparatus in accordance with claim 1 wherein the cutters comprise straight blades.

14. An apparatus in accordance with claim 1 wherein the leafy vegetables are one of a group comprising red leaf lettuce, green leaf lettuce, romaine lettuce, iceberg lettuce, frieze and oriental kale.

15. A method of harvesting and processing leafy vegetables with a harvesting apparatus, the method comprising:
   providing heads of leafy vegetables;
   supporting the heads of leafy vegetables on supports, wherein each support is configured to fit inside a leafy vegetable head and hold the head thereon;
   moving the supports past a series of cutters;
   cutting the heads of leafy vegetables with the cutters to thereby remove leaves from the heads of leafy vegetables; and
   collecting the leaves with a collector.

16. A method in accordance with claim 15 wherein the collector is a conveyor belt.

17. A method in accordance with claim 16 further comprising moving the conveyor belt to move the leaves to a packing station.

18. A method in accordance with claim 15 further comprising blowing cut leaves from the heads of leafy vegetables.

19. A method in accordance with claim 15 further comprising periodically spraying the heads of leafy vegetables and the leaves with a liquid comprising water.

20. A method in accordance with claim 15 further comprising moving the harvesting apparatus through a field.

21. A method in accordance with claim 20 wherein the harvesting apparatus is self-propelled.

22. A method in accordance with claim 15 wherein the harvesting apparatus is a trailer.

23. A method in accordance with claim 15 wherein the cutters are staggered vertically with respect to one another.

24. A method in accordance with claim 23 wherein the cutters are staggered in a descending manner such that a first cutter at a first end of the apparatus is at a first height and a last cutter at a second end of the apparatus is at a second height, the second height being lower than the first height and cutters in between the first and last cutters being at a lower height than an adjacent cutter relative to the first end.

25. A method in accordance with claim 24 wherein adjacent cutters are staggered vertically in a range of ¼ inch to 1¾ inches.

26. A method in accordance with claim 25 wherein adjacent cutters are staggered vertically ¼ inch.

27. A method in accordance with claim 15 wherein each support comprises a vacuum head coupled to a vacuum source and the method further comprises using suction at the vacuum heads to support the heads of leafy vegetables.

28. An apparatus for harvesting and processing leafy vegetables, the apparatus comprising:
   a body;
   a plurality of supports coupled to the body for movement relative thereto and configured for supporting pieces of leafy vegetables;
   a plurality of cutters coupled to the body and arranged serially, wherein the cutters are staggered in a descending manner such that a first cutter at a first end of the apparatus is at a first height and a last cutter at a second end of the apparatus is at a second height, the second height being lower than the first height and cutters in between the first and last cutters being at a lower height than an adjacent cutter relative to the first end, and wherein adjacent cutters are staggered vertically with respect to one another in a range of ¼ inch to 1¾ inches; and
   a transport system for moving the supports past the cutters; and
   a collector for collecting leaves cut from the vegetables 29. A method of harvesting and processing leafy vegetables with a harvesting apparatus, the method comprising:
   providing pieces of leafy vegetables;
   supporting the pieces of leafy vegetables on supports;
   moving the supports past a series of cutters, wherein the cutters are staggered in a descending manner such that a first cutter at a first end of the apparatus is at a first height and a last cutter at a second end of the apparatus is at a second height, the second height being lower than the first height and cutters in between the first and last cutters being at a lower height than an adjacent cutter relative to the first end, and wherein adjacent cutters are staggered vertically with respect to one another in a range of ¼ inch to 1¾ inches;

cutting the pieces of leafy vegetables with the cutters to thereby remove leaves from the pieces of leafy vegetables; and collecting the leaves with a collector.

30. A method of harvesting and processing leafy vegetables with a harvesting apparatus, the method comprising:

providing heads of leafy vegetables on supports, each support configured to fit inside a leafy vegetable head and hold the head thereon;

moving the supports past a series of cutters;

cutting the heads of leafy vegetables with the cutters to thereby remove leaves from the heads of leafy vegetables; and collecting the leaves with a collector.

31. The method of claim 30, wherein each support includes a vacuum head coupled to a vacuum source and the method further includes using suction at the vacuum heads to support the heads of leafy vegetables thereon.

\* \* \* \* \*